(12) United States Patent
Mintz et al.

(10) Patent No.: US 9,218,625 B2
(45) Date of Patent: *Dec. 22, 2015

(54) METHOD AND INTERFACE FOR HISTORICAL DISPLAY OF MARKET INFORMATION

(75) Inventors: Sagy Mintz, Lincolnshire, IL (US); Ryan Andrews, Evanston, IL (US); Scott Singer, Lake Bluff, IL (US); Jens-Uwe Schluetter, Evanston, IL (US)

(73) Assignee: Trading Technologies International, Inc., Chicago, IL (US)

( * ) Notice: Subject to any disclaimer, the term of this patent is extended or adjusted under 35 U.S.C. 154(b) by 899 days.

This patent is subject to a terminal disclaimer.

(21) Appl. No.: 13/229,676

(22) Filed: Sep. 10, 2011

(65) Prior Publication Data

US 2011/0320339 A1 Dec. 29, 2011

Related U.S. Application Data (63) Continuation of application No. 11/415,979, filed on May 2, 2006, now Pat. No. 8,036,977, which is a continuation of application No. 10/305,308, filed on Nov. 26, 2002, now Pat. No. 8,041,623.

(51) Int. Cl.
| | | |
|---|---|---|
| *G06Q 40/00* | (2012.01) | |
| *G06Q 40/06* | (2012.01) | |
| *G06Q 20/10* | (2012.01) | |
| *G06Q 40/02* | (2012.01) | |
| *G06Q 40/04* | (2012.01) | |

(52) U.S. Cl.
CPC .............. *G06Q 40/06* (2013.01); *G06Q 20/10* (2013.01); *G06Q 40/00* (2013.01); *G06Q 40/025* (2013.01); *G06Q 40/04* (2013.01)

(58) Field of Classification Search
USPC ........................................... 705/35–37
See application file for complete search history.

(56) References Cited

U.S. PATENT DOCUMENTS

| | | | |
|---|---|---|---|
| 5,812,988 A | 9/1998 | Sandretto | |
| 6,021,397 A * | 2/2000 | Jones et al. | 705/36 R |
| 6,772,132 B1 * | 8/2004 | Kemp et al. | 705/36 R |
| 6,938,011 B1 | 8/2005 | Kemp, II et al. | |
| 7,243,083 B2 | 7/2007 | Burns et al. | |
| 7,366,691 B1 | 4/2008 | Kemp, II et al. | |
| 7,389,268 B1 * | 6/2008 | Kemp et al. | 705/39 |
| 7,418,422 B2 | 8/2008 | Burns | |
| 7,571,140 B2 | 8/2009 | Weichert et al. | |

(Continued)

FOREIGN PATENT DOCUMENTS

| | | |
|---|---|---|
| EP | 1067471 A1 | 1/2001 |
| EP | 1109122 A2 | 6/2001 |

(Continued)

OTHER PUBLICATIONS

U.S. Appl. No. 10/305,308, filed Nov. 26, 2002, Mintz, et al.

(Continued)

*Primary Examiner* — Hani M Kazimi
(74) *Attorney, Agent, or Firm* — McDonnell Boehnen Hulbert & Berghoff LLP (57) ABSTRACT

Trading software may receive information from an exchange. The trading software may track historical bid and ask information for a tradeable object. The trading software may display historical market depth information for the tradeable object on a trading screen.

31 Claims, 6 Drawing Sheets

(56) References Cited

U.S. PATENT DOCUMENTS

| | | | |
|---|---|---|---|
| 7,610,240 | B2 | 10/2009 | Mintz et al. |
| 7,613,640 | B2 | 11/2009 | Horsfall |
| 2001/0032163 | A1 | 10/2001 | Fertik et al. |
| 2001/0034686 | A1 | 10/2001 | Eder |
| 2001/0042785 | A1* | 11/2001 | Walker et al. ............. 235/379 |
| 2002/0046147 | A1 | 4/2002 | Livesay et al. |
| 2003/0004852 | A1 | 1/2003 | Burns |
| 2003/0083973 | A1 | 5/2003 | Horsfall |
| 2004/0093300 | A1 | 5/2004 | Burns |
| 2004/0117302 | A1* | 6/2004 | Weichert et al. ............ 705/40 |

FOREIGN PATENT DOCUMENTS

| | | |
|---|---|---|
| EP | 1109122 A3 | 3/2002 |
| WO | 91/14231 A1 | 9/1991 |
| WO | 95/26005 A1 | 9/1995 |
| WO | 98/49639 A1 | 11/1998 |
| WO | 99/19821 A1 | 4/1999 |
| WO | 99/30259 A1 | 6/1999 |
| WO | 99/53424 A1 | 10/1999 |
| WO | 00/52619 A1 | 9/2000 |
| WO | 00/62187 A2 | 10/2000 |
| WO | 00/65510 A1 | 11/2000 |
| WO | 01/16830 A1 | 3/2001 |
| WO | 01/16852 A2 | 3/2001 |
| WO | 01/22315 A2 | 3/2001 |
| WO | 01/65403 A2 | 9/2001 |
| WO | 01/88808 A1 | 11/2001 |
| WO | 00/62187 A3 | 12/2001 |
| WO | 01/22315 A3 | 1/2002 |
| WO | 02/59815 A1 | 1/2002 |
| WO | 02/15461 A2 | 2/2002 |
| WO | 02/29686 A1 | 4/2002 |
| WO | 01/16852 A8 | 6/2002 |
| WO | 02/48945 A1 | 6/2002 |
| WO | 02/069226 A2 | 9/2002 |
| WO | 02/079940 A2 | 10/2002 |
| WO | 02/093325 A2 | 11/2002 |
| WO | 03/090032 A2 | 10/2003 |
| WO | 03/090032 A3 | 10/2003 |

OTHER PUBLICATIONS

U.S. Appl. No. 11/415,979, filed May 2, 2006, Mintz, et al.
"APT: A trading system for the future," The London International Financial Futures Exchange (LIFFE), 1990, 11 pages.
"Aurora: The most technologically advanced trading system available today," Chicago Board of Trade, 1989, 11 pages.
"Expanding futures and options trading around the world, around the clock," Globex, 1989, 48 pages.
"One Click Trading Options," Trading Technologies, Inc., 1998, one page.
"Sydney Futures Exchange Announces Plans to Join Globex," Globex Report: An Update on the CME global electronic exchange, vol. II, No. 2, Feb. 10, 1989,4 pages.
Carey, T.W., "The Electronic Investor: Get in Touch with Your Inner Quote," *Barron's*, Oct. 28, 2002, vol. 82, Iss. 43, p. T5, 4 pgs.
Cavaletti, C., "Order Routing," *Futures* Magazine, Feb. 1997, pp. 68-70.
Declaration of Brendan Bradley in Case No. 04 C 5312, Nov. 18, 2004, 27 pages.
Grummer et al., "Preliminary Feasibility Study," Bermudex Ltd., Nov. 1980,100 pages.
Hansell, S., "The computer that ate Chicago," Institutional Investor, Feb. 1989, 5 pages.
Kharouf, J. and Cavaletti, C. "A Trading Room with a View," *Futures*, vol. 27, Nov. 1998, pp. 66-71.
Market Watch Trading Screen, date not available, 1 page.
Memorandum Opinion and Order of Judge James B. Moran in Case No. 04 C 5312, Feb. 9, 2005, 22 pages.
Nasdaq's Niche, *Wall Street Journal* (Eastern edition), Nov. 15, 2001, New York: N.Y., p. A.26 (3 pages).
New York Mercantile Exchange (NYMEX) Access Documents, Feb. 28, 1992, 413 pages.
Peake et al., Appendix C of Preliminary Feasibility Study, "The ABCs of trading on a national market system," Bermudex Ltd., Sep. 1997,16 pages.
Peake, J.W., Appendix E of Preliminary Feasibility Study, "The last fifteen meters," Bermudex Ltd., Jun. 15, 1997,18 pages.
The Computer Assisted Trading System (CATS) Traders' Manual, Toronto Stock Exchange, Sep. 30, 1977, 142 pages.
Trading Screen, INTEX of Bermuda, 1984, one page.
Trading Screen, MEFF Exchange, 1990, one page.
Trading Screen, SWX Exchange, 1990, two pages.
Trading Screen, TIFFE Exchange, circa 1989-1990, one page.
USPTO Presentation, NASDAQ, Nov. 8, 2001, 15 pages.
Weber, B.W., "Information Technology in the Major International Financial Markets," Stem School of Business, New York University, Apr. 7, 1993, pp. 1-43.
X_Trader Product HTML Page [online], Trading Technologies International, Inc., Jun. 9, 2000. [Retrieved on Mar. 22, 2001] from the Internet: www.tradingtechnologies.com/products/xtrade_full.html.

* cited by examiner

FIG. 1

| Bid(t=0) | Price | Ask(t=0) | t-1 | t-5 | t-10 |
|---|---|---|---|---|---|
| | 20 | 45 | 12 | 61 | 32 |
| | 19 | 31 | 45 | 10 | 17 |
| | 18 | 12 | 52 | 14 | 31 |
| | 17 | 11 | 12 | 25 | 10 |
| 7 | 16 | | 10 | 6 | 2 |
| 6 | 15 | | 19 | 23 | 16 |
| 81 | 14 | | 68 | 44 | 77 |
| 14 | 13 | | 46 | 35 | 21 |

FIG. 2

| Bid(t=0) | Price | Ask(t=0) | t-1 | t-5 | t-10 |
|---|---|---|---|---|---|
| | 20 | 45 | RED | RED | RED |
| | 19 | 31 | RED | RED | RED |
| | 18 | 12 | RED | BLUE | RED |
| | 17 | 11 | RED | BLUE | RED |
| 7 | 16 | | BLUE | BLUE | BLUE |
| 6 | 15 | | BLUE | BLUE | BLUE |
| 81 | 14 | | BLUE | BLUE | BLUE |
| 14 | 13 | | BLUE | BLUE | BLUE |

| | 130 | 132 | 134 |
|---|---|---|---|
| | CRAN | RED | PINK |
| | 30+ | 11-30 | 0-10 |

| | 136 | 138 | 140 |
|---|---|---|---|
| | NAVY | BLUE | SKY |
| | 30+ | 11-30 | 0-10 |

| Bid(t=0) | Price | Ask(t=0) | t-1 | t-5 | t-10 |
|---|---|---|---|---|---|
| | 20 | 45 | RED | CRAN | CRAN |
| | 19 | 31 | CRAN | PINK | RED |
| | 18 | 12 | CRAN | BLUE | CRAN |
| | 17 | 11 | RED | BLUE | PINK |
| 7 | 16 | | SKY | BLUE | BLUE |
| 6 | 15 | | BLUE | BLUE | BLUE |
| 81 | 14 | | NAVY | NAVY | NAVY |
| 14 | 13 | | NAVY | NAVY | BLUE |

METHOD AND INTERFACE FOR HISTORICAL DISPLAY OF MARKET INFORMATION

CROSS REFERENCE TO RELATED APPLICATIONS

The present application is a continuation of U.S. application Ser. No. 11/415,979 filed on May 2, 2006, now U.S. Pat. No. 8,036,977. The Ser. No. 11/415,979 application is a continuation of U.S. application Ser. No. 10/305,308 filed on Nov. 26, 2002, now U.S. Pat. No. 8,041,623. The entire contents of the Ser. No. 10/305,308 and 11/415,979 applications are incorporated herein by reference.

FIELD OF THE INVENTION

The present invention relates generally to electronic trading. More specifically, it relates to a method for processing and displaying trading information.

BACKGROUND OF THE INVENTION

Many exchanges throughout the world now support electronic trading. Electronic trading has made it possible for an increasing number of people to actively participate in a market at any given time. The increase in the number of potential market participants has advantageously led to, among other things, a more competitive market and greater liquidity.

A trader can connect to an exchange, for example, using a client device, and the exchange can serve as a host. Once connected, software running on the client allows the trader to log onto one or more exchanges and participate in one or more markets. Some clients run software that creates specialized interactive trading screens. In general, the trading screens enable traders to enter orders into the market, obtain market quotes, and monitor positions. The range and quality of features available varies according to the specific trading software.

One such feature often displayed to traders is the current market depth. The current market depth represents the quantity of the tradeable object bids or asks currently outstanding at a particular price level. For example, a price level may have offers to buy particular quantities at that price level, or it may have offers to sell particular quantities at that price level. At any given time, a market typically includes offers to buy particular quantities at multiple price levels and offers to sell at particular quantities at multiple price levels. Among the outstanding offers to buy and sell, the inside market generally refers to the highest current bid price and lowest current ask price.

During trading, a trader may notice that the inside market seems to remain at a particular price level. This may occur when the price level has a large volume of available quantity. As orders fill at the price level, they may be subsequently replaced by new orders. Thus, small orders may not match enough volume to trade through this price level, thereby creating a feeling of resistance to moving away from that price level. While the trader may seemingly notice this resistance, known trading displays only provide the trader with views of the current market information. The trader cannot view the historical market activity at that, or other, price levels.

In the following detailed description, a trading application and trading interface for displaying historical market information are described. These tools provide advantages, as described below, to a trader in an electronic trading environment.

BRIEF DESCRIPTION OF THE DRAWINGS

The presently preferred embodiments of the present invention are described herein with reference to the drawings, in which.

DETAILED DESCRIPTION OF THE PRESENTLY PREFERRED EMBODIMENTS

Many different exchanges support electronic trading. Electronic trading allows a trader to interact with the exchanges from a remote location, such as by using a computer connected to the exchanges over one or more computer networks. Once connected to an exchange, the trader may receive market information about tradeable objects that are traded on the exchange. The trader may additionally trade the tradeable objects, such as by entering buy or sell orders.

A tradeable object can be any object, such as stocks, options, bonds, futures, currency, warrants, funds, or other financial objects. Other objects, for example, grains, energy and metals can also be traded. Of course, these list are not exhaustive, and any other object for which there exists a market can be traded. Tradeable objects can be "real," such as products that are listed by an exchange for trading, or they can by "synthetic," such as a combination of real products that is created by a trader. Of course, a tradeable object could actually be a combination of other tradeable objects, such as a class of tradeable objects.

Exchanges that support electronic trading are generally based on one or more hosts, one or more computer networks, and clients. In general, the host includes one or more centralized computers to form the electronic heart. Its operations may include order matching, maintaining order books and positions, price information, and managing and updating a database that records such information. The host may also be equipped with an external interface that maintains uninterrupted contact to the clients and possibly other trading-related systems.

Market participants may link to the host through one or more networks. A network is a group of two or more computers linked together. There are many types of networks such as local area networks and wide area networks. Networks can also be characterized by topology, protocol, and architecture. However, any type of network configuration can be used in electronic trading. For example, some market participants may link to the host through a direct connection such as a T1 line or an Integrated Digital Services Network ("ISDN") connection. When connecting through a direct connection, a market participant may connect through one or more common network components such as high-speed servers, routers, and gateways, and so on. Of course, a market participant may also connect to the exchange through the Internet or another type of network.

A method, system and interface for electronic trading with an exchange is described in U.S. patent application Ser. No. 09/590,692, filed Jun. 9, 2000, entitled "Click Based Trading with Intuitive Grid Display of Market," and issued Aug. 3, 2004 as U.S. Pat. No. 6,772,132. Similar methods, systems, and interfaces are is also described in U.S. patent application Ser. No. 09/589,751, filed Jun. 9, 2000, entitled "Clicked Based Trading with Market Depth Display," and issued Aug. 30, 2005 as U.S. Pat. No. 6,938,011. U.S. Pat. Nos. 6,772,132 and 6,938,011 are both commonly assigned to Trading Technologies International, Inc., and the entire contents of both are incorporated herein by reference. Moreover, the trading application may implement tools for trading tradeable objects that are described in a U.S. patent application Ser. No. 10/125,894 filed on Apr. 19, 2002, entitled "Trading Tools for Electronic Trading," and issued Jun. 17, 2008 as U.S. Pat. No. 7,389,268. The U.S. Pat. No. 7,389,268 is also assigned to Trading Technologies International, Inc., and the entire contents of the U.S. Pat. No. 7,389,268 are incorporated herein by reference. The three above-named patents describe network topologies, interfaces and general trading functionality and techniques that may be used in implementing the preferred embodiments described herein.

Trading screens may enable traders to enter and cancel orders, obtain market information, and monitor positions while implementing various trading strategies including those previously used on the floor of an exchange. For example, using the trading screen a trader may receive information about tradeable objects traded on the exchange. Additionally, the trader may use the trading screen, for example, to place buy and sell orders for the tradeable objects or to otherwise trade the tradeable objects.

Once connected to the exchange, the trading software may receive information from the exchange, which can in turn be displayed to the trader. For example, the trading software may receive a list of tradeable objects traded on the exchange. Additionally, the trading software may receive market information for each tradeable object, such as bid prices, bid quantities, ask prices, ask quantities, and additionally, some exchanges provides prices and quantities for past sales, and other market related information. The information may be continuously or regularly provided to the trading software, which allows the trading software to update the trading screen with current market information.

After the trading software receives this information from the exchange, the trading software can format and display the information. One such feature that is often displayed by trading software is at least a portion of the current market depth. The current market depth generally refers to the outstanding bid and ask quantities at particular prices in the market for the tradeable object. Thus, the current market depth may indicate quantities as offers to buy or sell at a particular price level. A market generally has offers to buy specified quantities outstanding at various different price levels and offers to sell specified quantities outstanding at various different price levels, and the current number of bid and ask quantities at the different price levels may be displayed to a trader.

The current outstanding bid and ask quantities may allow a trader to see the current state of the market. Based on this information, the trader may watch the movement of the market and may also place trades. As trades execute, the outstanding bid and ask quantities may be updated, and the new market information may then be displayed to the trader. In the course of trading, the inside market may move in association with orders entering the market.

On the other hand, the inside market may seemingly remain at a particular price level, thereby creating a feeling of resistance to moving away from that price level. Large volume depth over a long period of time can create the feeling of resistance, because smaller orders may not match enough volume to "trade through" the resistance level. Thus, as orders match at this price level, they may be replenished by new orders. This can seemingly prevent the market from moving to match orders at other levels.

In addition to viewing currently outstanding bid and ask quantities, it would be beneficial for a trader to see historical market information, such as market depth, which could give the trader further insight into the patterns of the market. For example, the trader could see if the historical market depth was thin or heavy at a price level, or the trader could see if there had been resistance at a particular price level. Viewing the historical market information may allow a trader to determine if it would be more difficult to match new orders at a price level, for example, by showing the trader that there is resistance at the price level. Therefore, the historical market information may help the trader make decisions on whether to place an order and at what price level to place the order.

Figure 1:
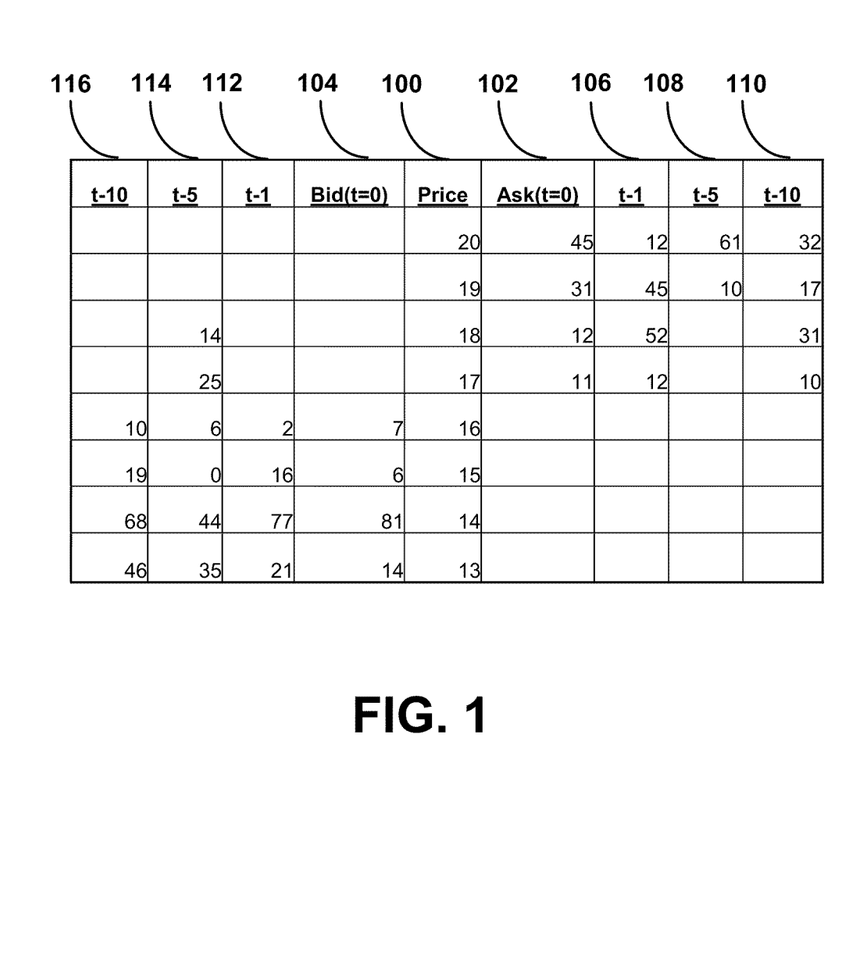
FIG. 1 is a preferred embodiment of a trading screen for displaying historical market information.

FIG. 1 is a preferred embodiment of a trading screen for displaying historical market information. As depicted in FIG. 1, the trading screen includes a price column 100. The price column 100 displays various different price levels for a tradeable object. The current ask quantity column 102 displays current ask quantities at various different price levels. The current bid quantity column 104 displays current bid quantities at various different price levels. Thus, the current ask quantity column 102 and the current bid quantity column 104 display the current market depth. The bid and ask quantities in the bid and ask quantity columns 102, 104 may be displayed using any type of indicator. For example, the indicator may be graphical representation of quantity (e.g., colors, bars, etc. . . . ), or the indicator may be a textual representation of quantity, such as a number. Various combinations of indicators may also be used, for example, a text representation in combination with a color.

As depicted in FIG. 1, the outstanding bid quantities and ask quantities are displayed in association with price levels arranged along a common static axis or scale of prices. The price levels are fixed in relation to the bid and ask quantity columns 102, 104, such that the indicators in these columns 102, 104 may move relative to the static axis of prices. For example, the bid and ask quantities displayed by the trading screen may change, and the inside market may move away from the price level depicted in FIG. 1. While the trading application may update the quantities, and while the position of the inside market may change, the range of price levels displayed in the price column 100 and the respective positions of the price levels displayed in the price column 100 may remain fixed.

It should be noted that the static axis of prices is not necessarily immovable with respect its physical position on the display screen, but rather may be moved to various different positions on the display. The user may use a mouse or other input device, for example, to reposition static axis of prices to a different location on the display screen, such as by dragging the static axis of prices from one side of the display screen to the other side of the display screen. In another example, the user may vary which portion of the static axis of prices is displayed, such as by scrolling up or down the axis or by entering a repositioning command.

One commercially available trading application that allows a user to trade in an electronic trading environment, and which may be used in the preferred embodiments, is X_TRADER® from Trading Technologies International, Inc. of Chicago, Ill. X_TRADER® also provides an electronic trading interface, referred to as MD Trader™, in which working orders and/or bid and ask quantities are displayed in association with a static price axis or scale. Portions of the X_TRADER® and the MD Trader™-style display are described in the previously referenced applications. It should be understood, however, that the preferred embodiments are not limited to any particular display, such as X_TRADER® or MD Trader™-style displays, but may be used with a variety of different display types.

In addition to displaying current market depth information, the trading screen of FIG. 1 displays historical market depth information. A first historical ask quantity column 106 displays ask quantities that were available at a previous time. A second historical ask quantity column 108 and a third historical ask quantity column 110 also display ask quantities available at previous times. These columns 106, 108, 110, therefore, allow a trader to view the available ask quantities at previous times and to see the historical market depth at the various different price levels.

The historical ask quantity columns 106, 108, 110 display the available ask quantities at previous times, and the previous times may be configured in a variety of different ways. As shown in FIG. 1, the first historical ask quantity column 106 displays the available ask quantities at one time period (i.e., t−1 in this example) prior to the current time. The second historical ask quantity column 108 displays the available ask quantities at five time periods (i.e., t−5 in this example) prior to the current time, and the third historical ask quantity column 110 displays the available ask quantities at ten time periods (i.e., t−10 in this example) to the current time.

FIG. 1 displays a preferred embodiment using a "snapshot" view of the historical data. In the snapshot view, the historical ask quantity columns 106, 108, 110 each display the available ask quantities outstanding at their respective previous times. For example, the third historical ask quantity column 108 displays the available ask quantities at its respective time without reference to the ask quantities that were available at previous times. Similarly, the second historical ask quantity column 108 displays the available ask quantities for its respective time without reference to the ask quantities that were available at previous times. The first historical ask quantity column 106 also just displays the available ask quantity for its respective time.

In another preferred embodiment, the trading screen displays the historical data using an "aggregation" view. In the aggregation view, the historical ask quantity columns 106, 108, 110 display a running total of the historical data. For example, the historical ask quantity columns 106, 108, 110 can each display available ask quantities from their respective times and from previous times. The third historical ask quantity column 110 can display the available ask quantities at its respective time, and also possibly from previous times. The second historical ask quantity column 108 can then display an ask quantity that includes the ask quantity outstanding at its respective time and also from prior times, such as the ask quantity displayed in the third historical ask quantity column 110. The first historical ask quantity column may also display an aggregated value, such as the available ask quantity at its respective time and also at the available ask quantity displayed in the second historical ask quantity column 108. Using the aggregation view, the second historical ask quantity column 108 will generally display a value that is greater than the third historical ask quantity column 110, and the first historical ask quantity column 106 will generally display a value that is greater than the second historical ask quantity column 108.

The time period used by the historical ask quantity columns 106, 108, 110 may be any measure of time. For example, the time period may be seconds, minutes, hours or other measures of time. Of course, the time period may also be fractions of seconds, minutes or hours. As shown in FIG. 1, the historical ask quantity columns 106, 108, 110 display the available ask quantities at specified numbers of time periods prior to the current time. It should be understood, however, that the specified time period offsets from the current time for each of the historical ask quantity columns 106, 108, 110 displayed in FIG. 1 is arbitrary, and other embodiments may use any other number of time period offsets. For example, it is not necessary that the first historical ask quantity column 106 display the ask quantity available at one time period prior to the current time, but it may display the ask quantity available at any other time prior to the current time. Similarly, the other historical ask quantity columns may also be modified to display the available ask quantities at any other number of time periods prior to the current time.

In addition to varying the time period offsets of the historical ask quantity columns 106, 108, 110, the number and/or order of historical ask quantity columns may be varied. As shown in FIG. 1, the trading screen includes three historical ask quantity columns 106, 108, 110. However, other embodiments may use a greater or fewer number of historical ask quantity columns. In another variation, the historical ask quantity columns 106, 108, 110 may be configured such that the historical ask quantity columns 106, 108, 110 do not display the available ask quantities in an increasing time period offset. Thus, the first historical ask quantity column 106 may display the available ask quantity at a time prior to that of the available ask quantity displayed in the second historical ask quantity column 108. The other historical ask quantity columns may be varied in a similar manner. A similar effect may also be achieved by rearranging the order of the historical ask quantity columns 106, 108, 110.

In a preferred embodiment, the historical ask quantity columns 106, 108, 110 may be configured by a user. For example, the user may alter the time period used in computing the historical ask quantities. In another example, the user may alter the time period offset of one or more of the historical ask quantity columns 106, 108, 110. In yet another example, the user may alter the number of historical ask quantity column 106, 108, 110, or the user may alter the order of the historical ask quantity columns 106, 108, 110. Of course, the user may make other changes.

In addition to displaying historical market information for the ask quantities, the trading screen of FIG. 1 displays historical market information for the bid quantities. A first historical bid column 112 displays bid quantities that were available at a previous time. Similarly, a second historical bid column 114 and a third historical bid column 116 display available bid quantities for times prior to the current time. As with the historical ask columns 106, 108, 110, the historical bid columns 112, 114, 116 may display historical data using a snapshot view or an aggregation view. The view used by the historical ask columns 106, 108, 110 may differ from the view used by the historical bid columns 112, 114, 116. Also, as with the historical ask columns 106, 108, 110, it is not necessary that the historical bid columns 112, 114, 116 all use the same view.

As previously described with respect to the historical ask quantity columns 106, 108, 110, the historical bid quantity columns 112, 114, 116 may be similarly configured. In a preferred embodiment, changes made with respect to the historical ask quantity columns 106, 108, 110 are also made with respect to the historical bid quantity columns 112, 114, 116. For example, if the time period is varied, then the new time period would apply to both the historical ask quantity columns 106, 108, 110 and the historical bid quantity columns 112, 114, 116. In a preferred embodiment, a change made with respect to one of the historical ask quantity columns 106, 108, 110 is also made to the corresponding historical bid quantity column 112, 114, 116. For example, if the time period offset of the first historical ask quantity column 106 is varied, then the time period offset of the first historical bid column 112 is also varied. Of course, changes in the historical bid quantity columns 112, 114, 116 may also be applied to the historical ask quantity columns 106, 108, 110.

In an alternate embodiment, changes made with respect to the historical ask quantity columns 106, 108, 110 are not correspondingly made to the historical bid quantity columns 112, 114, 116. Similarly, in an alternate embodiment, changes made with respect to the historical bid quantity columns 112, 114, 116 are not made with respect to the corresponding historical ask quantity columns 106, 108, 110. For example, the first historical ask quantity column 106 and the first historical bid column 112 may be configured to use different time period offsets from the current time. In another example, the historical ask quantity columns 106, 108, 110 and the historical bid quantity columns 112, 114, 116 may use different time periods. In yet another example, the trading screen may display a different number of historical ask quantity columns than historical bid quantity columns.

Other changes are also possible. In another preferred embodiment, the order of the columns may be rearranged. For example, the order of the historical ask quantity columns 106, 108, 110 may be varied. Of course, the order of the historical bid quantity columns 112, 114, 116 may also be varied. In another embodiment, only the historical ask quantity columns 106, 108, 110 or only the historical bid quantity columns 112, 114, 116 may be displayed. In another embodiment, the orientation of the display may be changed from columns to rows. Of course, these examples are not exhaustive, and other changes may also be made.

As shown in FIG. 1, for each price level generally includes an entry in one of the corresponding historical bid and ask quantity columns 106, 108, 110, 112, 114, 116 for each previous time period. For example, the "18" price level includes a corresponding entry for time "t−1" in the first historical ask quantity column 106, it includes a corresponding entry for time "t−5" in the second historical bid column 114, and it includes a corresponding entry for the time "t−10" in the third historical ask column 110. Thus, the "18" price level had either an outstanding bid or ask quantity for the three previous times.

It should be understood, however, that a particular price level would not necessarily always have either an outstanding bid or ask quantity. For example, the inside market can move away from a particular price level, thereby decreasing the likelihood that a trader would place an order at that price levels and that the price level would have outstanding bid or ask quantities. In another example, the trading volume may be light, and there may simply be no outstanding ask quantities at one or more of the price levels even if it is closer to the inside market. Of course may other reasons also exist for having no outstanding ask quantities at one or more price levels.

In this case, the corresponding ask quantity cell may display a "0", display nothing, or display some other indicator corresponding to no outstanding quantity at that price level. For example, as shown in FIG. 1, there is neither an outstanding bid or ask quantity at time "t−5" for the "15" price level. Thus, the corresponding cells in the second historical ask column 108 and the second historical bid column 114 do not indicate any available quantities. If there had been no available quantity for an extended period of time, it is possible that all the corresponding cells in the historical bid and ask quantity columns 106, 108, 110, 112, 114, 116 would reflect no available quantities.

Figure 2:
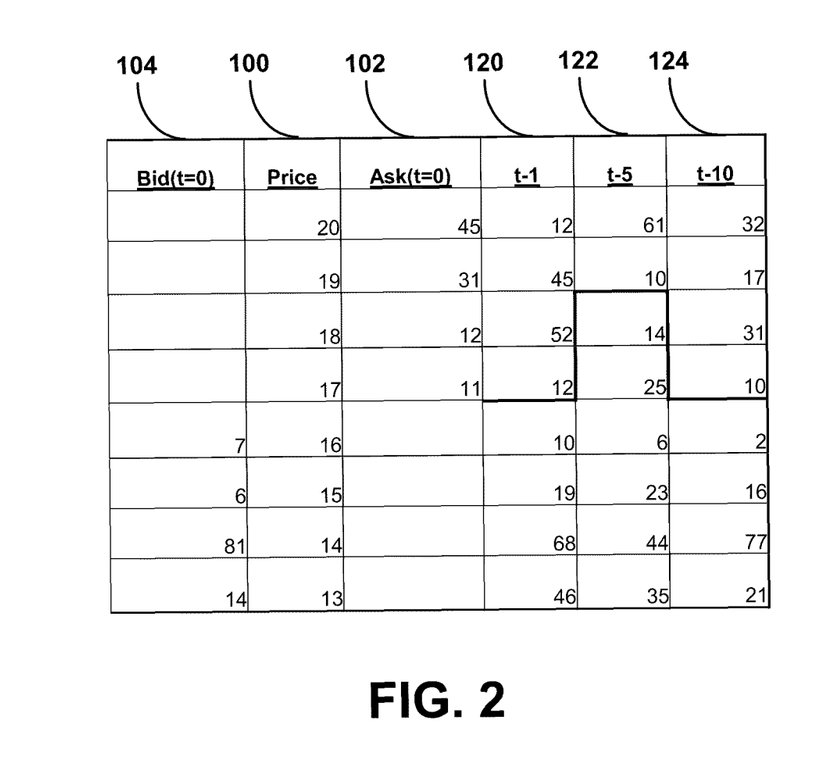
FIG. 2 is a preferred embodiment of the trading screen of FIG. 1 in which historical bid information and historical ask information are combined into an interleaved display.

FIG. 2 is a preferred embodiment of the trading screen of FIG. 1 in which historical bid information and historical ask information are combined into an interleaved display. As shown in FIG. 2, the price column 100 displays prices levels for tradeable objects. The current ask quantity column 102 and the current bid quantity column 104 display currently available ask and bid prices respectively.

In addition to displaying the current market information, the trading screen also displays historical market information. A first historical combined column 120 displays historical bid and ask information at a time prior to the current time. A second historical combined column 122 and a third historical combined column 124 each display bid and ask information at times prior to the current time. Thus, the first historical combined column 120 may include ask quantities at a time prior to the current time, and it may include bid quantities at the same time prior to the current time. Similarly, the second historical combined column 122 and the third historical combined column 124 may each include ask quantities and bid quantities at their respective prior times.

While the trading screen depicted in FIG. 1 uses separate historical ask quantity columns 106, 108, 110 to display historical ask information and historical bid quantity columns 112, 114, 116 to display historical bid information, the trading screen depicted in FIG. 2 combines the historical bid and ask information into an interleaved display. Thus, the historical market information displayed in the historical ask quantity and bid quantity columns 106, 108, 110, 112, 114, 116 of FIG. 1 is interleaved for display in the historical combined columns 120, 122, 124 of FIG. 2.

In a preferred embodiment, the historical combined columns 120, 122, 124 may be color coded, for example, by using different background colors for bid information than for ask information. Color coding the historical combined columns 120, 122, 124 may allow a trader to easily differentiate those entries that represent a historical ask quantity from those entries that represent a historical bid quantity. Of course, the historical bid and ask information may be differentiated in other ways. In one alternate embodiment, different fonts (e.g., different font types, different font colors, different font sizes or other differences) may be used to differentiate bid and ask information. In another alternate embodiment, the bid and ask information may be formatted differently. For example, the ask prices may be displayed by simply displaying the quantity, such as "41." However, the bid quantities may be bracketed, such as "[41]" or "(41)" in order to differentiate them from the ask quantities. Of course, the ask prices may also be otherwise formatted in addition to or in place of the formatting for the bid prices, and formatting other than brackets may also be used.

Figure 3:
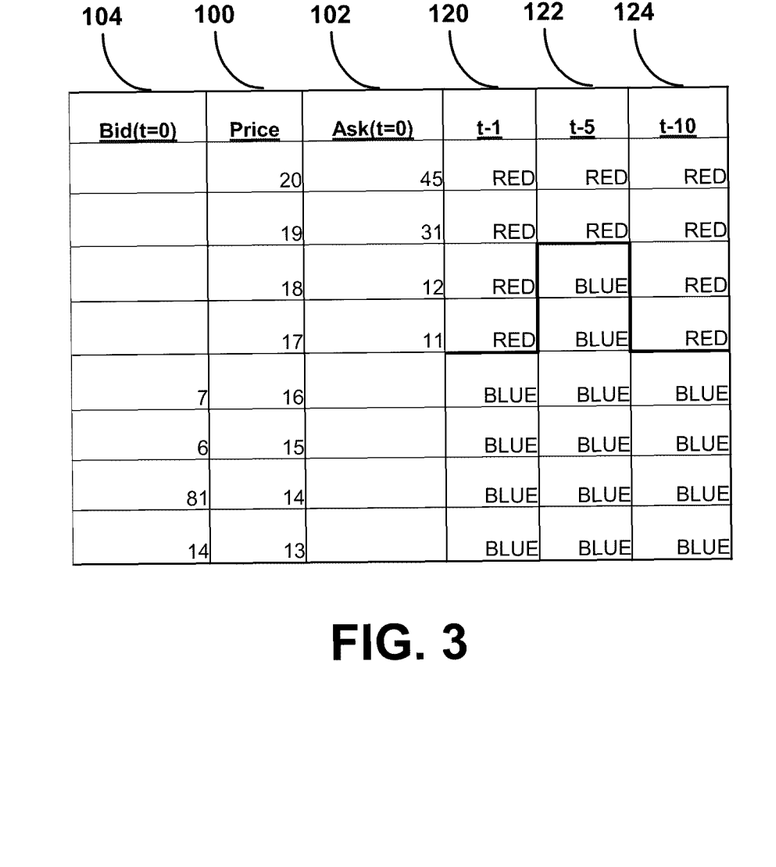
FIG. 3 illustrates a preferred color-coding scheme for differentiating bid quantity and ask quantity information in the trading screen of FIG. 2, where one color is used for historical bid information and another color is used for historical ask information.

FIG. 3 illustrates a preferred color-coding scheme for differentiating bid and ask information in the trading screen of FIG. 2 in which one color is used for historical bid information and another color is used for historical ask information. As previously described, the historical bid and ask information displayed in the trading screen of FIG. 2 may be color-coded in order to differentiate between historical bid information and historical ask information. This may be done, for example, by using a different background color for displaying bid information than is used for displaying ask information. Thus, in the interleaved display of FIG. 2, blocks in the historical combined columns 120, 122, 124 that display bid information may be displayed using one background color while blocks that display ask information may be displayed using another color.

FIG. 3 illustrates the background colors that may be used with the trading screen of FIG. 2. As shown in FIG. 3, blocks in the historical combined columns 120, 122, 124 that include ask information are marked with the identifier "RED." Blocks in the historical combined columns 120, 122, 124 that include bid information are marked with the identifier "BLUE." The identifiers "RED" and "BLUE" indicate preferred background colors that may be displayed in conjunction with the bid and ask information. Thus, blocks that include ask information may be displayed with a red background, and blocks that include bid information may be displayed with a blue background. Of course, other embodiments may use any other colors to differentiate the historical bid and ask information.

Figure 4:
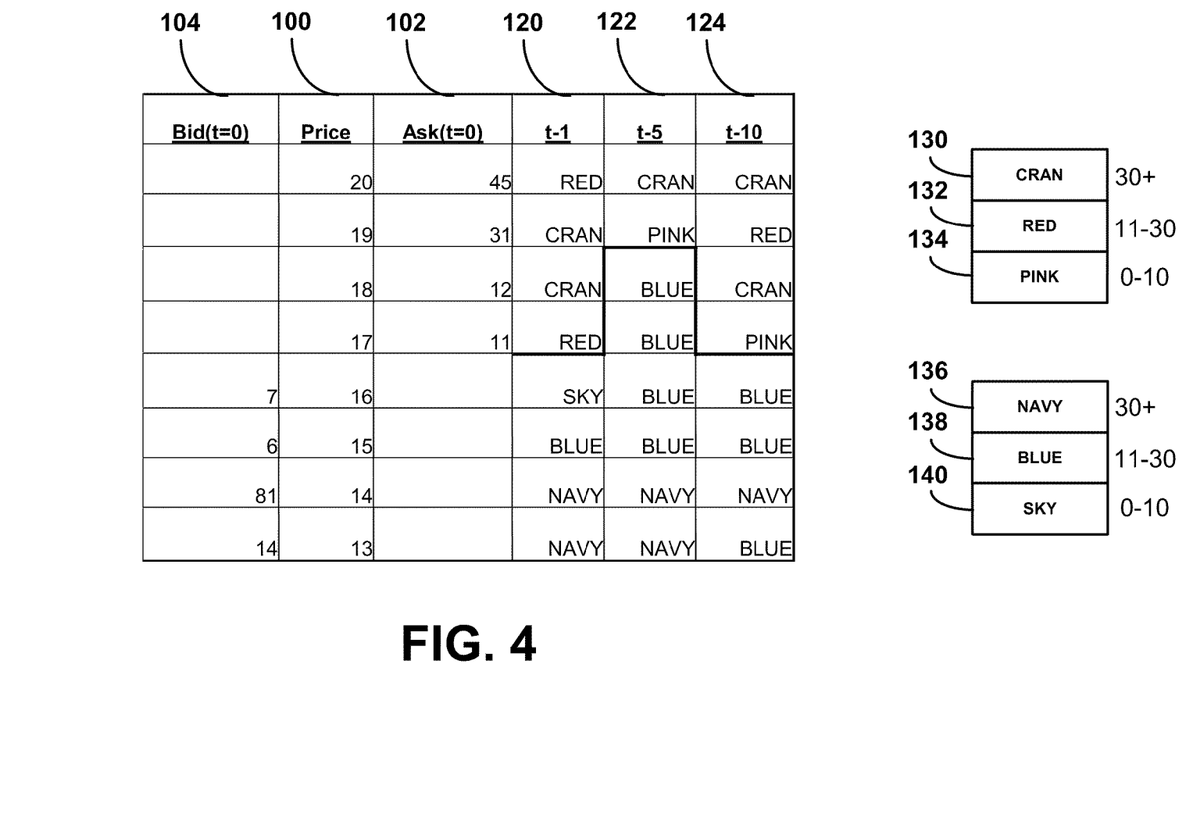
FIG. 4 illustrates a preferred color-coding scheme for differentiating bid quantity and ask quantity information in the trading screen of FIG. 2, where multiple colors are used to indicate historical bid volumes and historical ask volumes.

FIG. 4 illustrates a preferred color-coding scheme for differentiating bid and ask information in the trading screen of FIG. 2 in which multiple colors are used to indicate historical bid volumes and historical ask volumes. In this preferred embodiment, bid and ask information in the historical combined columns 120, 122, 124 may be differentiated using background colors. Further color differentiations may be made within the ask information and the bid information. For example, different shades of colors may be used to differentiate historical ask volumes, and different shades of colors may be used to differentiate historical bid volumes.

As depicted in FIG. 4, different shades of one color family are used to differentiate historical ask volumes, and different shades of another color family are used to differentiate historical bid volumes. An ask legend includes three blocks 130, 132, 134, which indicate the color shades used to display the historical ask volumes. The "CRAN" label in Block 130 indicates that block in the historical combined columns 120, 122, 124, that display an historical ask volume greater than 30 are displayed with a cranberry colored background.

Of course, the labels used in FIG. 4 are for illustration purposes, and may be replaced with the actual colors in the trading screen. For example, instead of displaying the label "CRAN," the trading screen may display a cranberry colored background. Block 132 uses the "RED" label to indicate that blocks having a historical ask volume between 11 and 30 are displayed with a red background, while the "PINK" label in Block 134 indicates that blocks having a historical ask volumes of 0 to 10 are displayed with a pink background.

While the red color family may be used to differentiate historical ask volumes, the contrasting blue color family may be used to differentiate historical bid volumes. A bid legend also includes three blocks 136, 168, 140 that indicate the color shades used to display historical bid information. As indicated by the "NAVY" label in Block 136, blocks in the historical combined columns 120, 122, 124 that display historical bid volumes greater than 30 are displayed with a navy background. Block 138, which includes that "BLUE" label, indicates that blocks displaying historical bid volumes between 11 and 30 are displayed with a blue background. The "SKY" label in Block 140 indicates that block displaying historical bid volumes from 0 to 10 are displayed with a sky blue background.

Many different variations may be made to the trading screen depicted in FIG. 4. In one alternate embodiment, different color shades may be used to differentiate among the respective volume levels. In another alternate embodiment, colors other than red or blue may be used to indicate the bid and ask volumes. Of course, it is not necessary that a particular color family be used for the bid or ask volume levels, but rather the colors indicating the various bid or ask volume levels may be unrelated. In another embodiment, a greater or fewer number of volume levels may be used within the bid or ask volumes, and the bid and ask volumes may each include a different number of levels. In yet another embodiment, the ranges of the volume levels may vary. For example, ranges other than 0-10, 11-30 and 30+ may be used. Additionally, the bid level ranges may differ from the ask level ranges.

In another embodiment, the display may be a 3-dimensional display. For example, the color-coded cells may extend into a third dimension in order to display the historical volumes. Any different orientation may be used for the 3-d display. For example, in one embodiment the historical information may be displayed in a 3-d graph such that the x-axis represents quantity, the y-axis represents price, and the z-axis represents time (with z=0 being the current time). Of course, these orientations are merely exemplary in nature other orientations can also be used.

In one embodiment, the 3-d graph can be displayed in conjunction with the price column 100, ask column 102 and bid column 104, as shown in FIG. 4. In another embodiment, the 3-d graph may be displayed in relation to a static axis of prices, but displayed apart from the price column 100, ask column 102 and/or bid column 104. In yet another embodiment, separate 3-d graphs for the historical ask information and historical bid information can be used, such as by displaying them on opposite sides of the price column 100.

Figure 5:
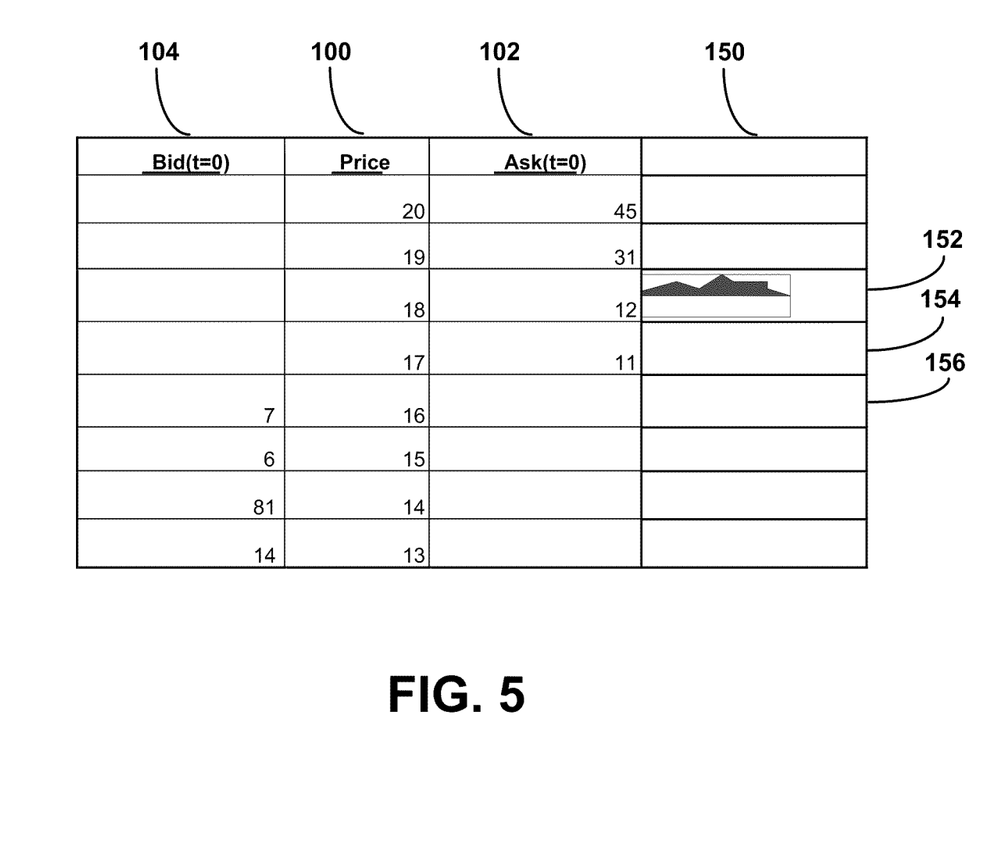
FIG. 5 is a preferred embodiment of a trading screen for displaying historical market information using a graphical representation.

FIG. 5 is a preferred embodiment of a trading screen for displaying historical market information using a graphical representation. As depicted in FIG. 5, the trading screen includes the price column 100, the current ask quantity column 102 and the current bid quantity column 104. The trading screen additionally includes a graphical historical column 150, which may display a graphical representation of the historical bid and ask information at the different price levels.

As shown in FIG. 5, the graphical historical column 150 includes a graphical display of the historical volume information for each price level. Block 152 includes a graph of the historical volume information for the "18" price level. Block 154 includes a graph of the historical volume information for the "17" price level, and Block 156 includes a graph of the historical volume information for the "16" price level. While FIG. 5 depicts the graphical historical column 150 in place of the historical bid and ask columns 106, 108, 110, 112, 114, 116, it should be understood that the graphical historical column 150 may be used on conjunction with one or more of the historical bid and ask columns 106, 108, 110, 112, 114, 116.

Figure 6A:
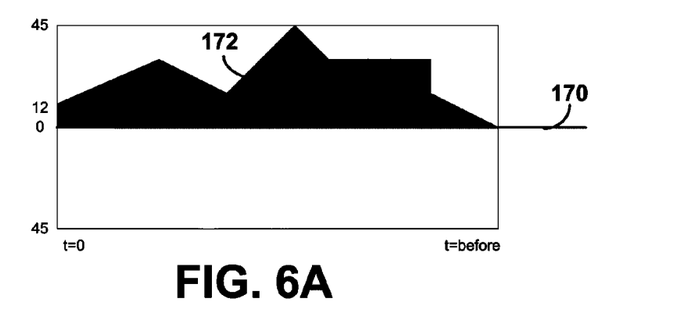
FIGS. 6A-6C illustrate historical market graphs that may be used in the trading screen of FIG. 5.

FIG. 6A is a graph of the historical volume information displayed in Block 152 of FIG. 5. FIG. 6A depicts the historical volume information in a graphical format. A horizontal axis 170 provides a demarcation between ask volume information and bid volume information. Regions above the horizontal axis 170 generally denote historical ask quantity information while regions below the horizontal axis 170 generally denote historical bid quantity information; however, this orientation may be reversed.

As shown in FIG. 6A, the horizontal axis 170 progresses in time from the current time, which is located at the far left of the graph, to an predetermined earlier time at the far right of the graph. Alternatively, the orientation may be reversed such that the current time is at the far right of the graph, or another orientation may be used. A top region 172 located above the horizontal axis 170 displays historical ask volume information. The historical ask volumes are graphed with respect to a vertical axis with greater volumes appearing further above the horizontal axis 170. Thus, the graph in FIG. 6A depicts that, for the time shown, this price level always had available ask volumes.

While FIG. 6A displays the historical volume information using a line graph, it should be understood that any different type of graphical representation may be used. For example, alternate embodiments may other types of graphs, such as bar graphs. Additionally, the various embodiments are not limited to using a 2-dimensional graph, which is depicted in FIG. 6A. Rather, alternate embodiments may use a 3-dimensional graph or any n-dimensional graph. Other types of graphs, such as bar graphs or plotted points, may also be used.

Other changes may also be made. For example, the orientation of the axes may be changed. The time period represented by the graph may be changed. The scale of the graph may be changed. Also, one or more price levels may use one type of graph, while one or more of the other price levels use a different type of graph or use no graph at all. The various features of the graphs may also differ for different price levels.

Figure 6B:
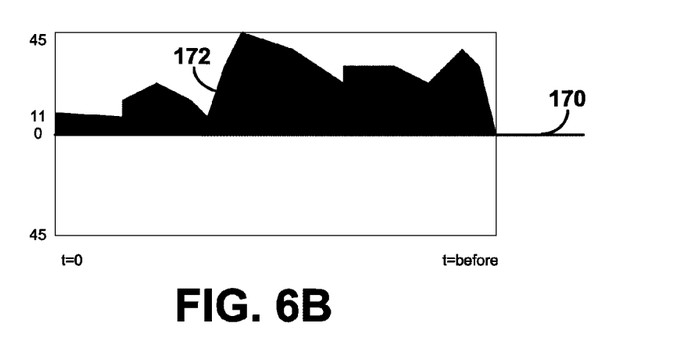

FIG. 6B is a graph of the historical volume information displayed in Block 154 of FIG. 5. FIG. 6B also displays the historical depth information in a graphical representation. The top region 172 displays historical ask information at this price level. Thus, the graph of FIG. 6B indicates that this price level always has an available ask quantity over the depicted period of time.

Figure 6C:
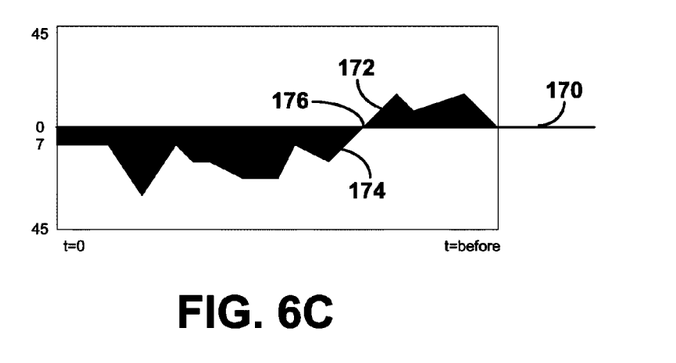

FIG. 6C is a graph of the historical volume information displayed in Block 156 of FIG. 5. As shown in FIG. 6C, the graph includes a top region 172 that displays historical ask information for this price level. Additionally, a bottom region 174 displays historical bid information for this price level. Thus, the graph of FIG. 6C shows that this price level has had both outstanding bid quantities and outstanding ask quantities at different times over the displayed time period. In a preferred embodiment, the top region 172 and bottom region 174 may be color-coded to distinguish between the outstanding bid quantities and the outstanding ask quantities. At point 176, the graph crosses the horizontal axis 170, thereby indicating the point at which this price level has neither an outstanding bid quantity nor an outstanding ask quantity.

While FIG. 6C depicts an immediate transition from outstanding ask quantities to outstanding bid quantities at this price level, it should be understood that there can be gaps in time where there is no available bid or ask quantity at this price level. Thus, the graph can display an extended separation between the top region 172 and the bottom region 174, such as a straight line that extends along the horizontal axis 170, to reflect the time gap where there is no available bid or ask quantity. These transitions are merely examples, and the changes in available quantities can cause the graph can transition between two different top regions or two different bottom regions. Also, the graph may include more than one point where there is no available bid or ask quantity. If there is no available bid or ask quantity for the entire time period of the graph, then the graph may just display a straight line and would generally not have a top region 172 or a bottom region 174.

It should be understood that the programs, processes, methods and apparatus described herein are not related or limited to any particular type of computer or network apparatus (hardware or software), unless indicated otherwise. Various types of general purpose or specialized computer apparatus may be used with or perform operations in accordance with the teachings described herein. While various elements of the preferred embodiments have been described as being implemented in software, in other embodiments hardware or firmware implementations may alternatively be used, and vice-versa.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more, fewer or other elements may be used in the block diagrams.

The claims should not be read as limited to the described order or elements unless stated to that effect. In addition, use of the term "means" in any claim is intended to invoke 35 U.S.C. §112, paragraph 6, and any claim without the word "means" is not so intended. Therefore, all embodiments that come within the scope and spirit of the following claims and equivalents thereto are claimed as the invention.

We claim:

1. A method for displaying market information comprising:

displaying, via an electronic display having an electronic processor, a bid indicator for at least one of a plurality of bid orders for a tradeable object, the bid indicator being displayed at one of a plurality of axially aligned price levels corresponding to a bid price of the at least one of the plurality of bid orders according to market information received from an electronic exchange during a current time;

displaying, via the electronic display, an ask indicator for at least one of a plurality of ask orders for the tradeable object, the ask indicator being displayed at one of the plurality of axially aligned price levels corresponding to an ask price of the at least one of the plurality of ask orders according to the market information received from the electronic exchange during the current time;

displaying, via the electronic display, a total bid indicator for a total bid quantity available at the one of the plurality of axially aligned price levels corresponding to the bid price of the at least one of the plurality of bid orders during a prior time period, the total bid quantity being determined according to the market information received from the electronic exchange during the prior time period; and displaying, via the electronic display, a total ask indicator for a total ask quantity available at the one of the plurality of axially aligned price levels corresponding to the ask price of the at least one of the plurality of ask orders during the prior time period, the total ask quantity being determined according to the market information received from the electronic exchange during the prior time period.

2. The method of claim 1 where the total bid indicator is displayed along the at least one of the plurality of axially aligned price levels corresponding to the bid price.

3. The method of claim 1 where the total ask indicator is displayed along the at least one of the plurality of axially aligned price levels corresponding to the ask price.

4. The method of claim 1 further comprising:
displaying a plurality of bid indicators along the plurality of axially aligned price levels; and
displaying a plurality of ask indicators along the plurality of axially aligned price levels.

5. The method of claim 4 where the plurality of bid indicators are displayed in a bid order region aligned with the plurality of axially aligned price levels and the plurality of ask indicators are displayed in an ask order region aligned with the plurality of axially aligned price levels.

6. The method of claim 1 where the total bid indicator is displayed in a prior bid region aligned with the plurality of axially aligned price levels, and where the total ask indicator is displayed in a prior ask region aligned with the plurality of axially aligned price levels.

7. The method of claim 1, further comprising:
for each of a plurality prior time periods, displaying a plurality of total bid locations, each of the plurality of total bid locations being aligned with the plurality of axially aligned price levels; and
displaying at least one total bid indicator along at least one of the total bid locations, where the at least one total bid indicator is determined according to a total bid quantity available during the at least one of the plurality of prior time periods for the at least one of the total bid location for the at least one of the one of the plurality of axially aligned price levels with which the at least one of the total bid locations is aligned.

8. The method of claim 7 where a number of the prior time periods is variable.

9. The method of claim 1, further comprising:
for each of a plurality prior time periods, displaying a plurality of total ask locations, each of the plurality of total ask locations being aligned with the plurality of axially aligned price levels; and
displaying at least one total ask indicator along at least one of the total ask locations, where the at least one total ask indicator is determined according to a total ask quantity available during the at least one of the plurality of time periods for the at least one of the total ask location for the at least one of the one of the plurality of axially aligned price levels with which the at least one of the total ask locations is aligned.

10. The method of claim 9 where a number of the prior time periods is variable.

11. The method of claim 1 where an amount of time of the prior time period is variable.

12. The method of claim 1, further comprising:
receiving a user command via a user input device to select and place an icon in one of a plurality of order entry locations of an order entry region aligned with an associated one of the plurality of price levels of the price axis; and
in response to receiving the user command, submitting an order to the electronic exchange, the order having a price corresponding to the associated one of the plurality of price levels.

13. The method of claim 1, further comprising:
in response to receiving a user command to select and place an icon in one of a plurality of order entry locations aligned with an associated one of the plurality axially aligned price levels, submitting an order to the electronic exchange, the order having a price corresponding to the associated one of the plurality of axially aligned price levels.

14. The method of claim 13 where the user command establishes an order quantity for the order.

15. A non-transitory computer readable medium having instructions stored therein, which when executed by a processor, cause the processor to execute acts comprising:
displaying, via an electronic display associated with the processor, a bid indicator for at least one of a plurality of bid orders for a tradeable object, the bid indicator being displayed at one of a plurality of axially aligned price levels corresponding to a bid price of the at least one of the plurality of bid orders according to market information received from an electronic exchange during a current time;
displaying, via the electronic display, an ask indicator for at least one of a plurality of ask orders for the tradeable object, the ask indicator being displayed at one of the plurality of axially aligned price levels corresponding to an ask price of the at least one of the plurality of ask orders according to the market information received from the electronic exchange during the current time;
displaying, via the electronic display, a total bid indicator for a total bid quantity available at the one of the plurality of axially aligned price levels corresponding to the bid price of the at least one of the plurality of bid orders during a prior time period, the total bid quantity being determined according to the market information received from the electronic exchange during the prior time period; and
displaying, via the electronic display, a total ask indicator for a total ask quantity available at the one of the plurality of axially aligned price levels corresponding to the ask price of the at least one of the plurality of ask orders during the prior time period, the total ask quantity being determined according to the market information received from the electronic exchange during the prior time period.

16. The non-transitory computer readable medium of claim 15 where the total bid indicator is displayed along the at least one of the plurality of axially aligned price levels corresponding to the bid price.

17. The non-transitory computer readable medium of claim 15 where the total ask indicator is displayed along the at least one of the plurality of axially aligned price levels corresponding to the ask price.

18. The non-transitory computer readable medium of claim 15 where the acts further comprise:
displaying a plurality of bid indicators along the plurality of axially aligned price levels; and
displaying a plurality of ask indicators along the plurality of axially aligned price levels.

19. The non-transitory computer readable medium of claim 18 where the plurality of bid indicators are displayed in a bid order region aligned with the plurality of axially aligned price levels and the plurality of ask indicators are displayed in an ask order region aligned with the plurality of axially aligned price levels.

20. The non-transitory computer readable medium of claim 15 where the total bid indicator is displayed in a prior bid region aligned with the plurality of axially aligned price levels, and where the total ask indicator is displayed in a prior ask region aligned with the plurality of axially aligned price levels.

21. The non-transitory computer readable medium of claim 15, where the acts further comprise:
for each of a plurality prior time periods, displaying a plurality of total bid locations, each of the plurality of total bid locations being aligned with the plurality of axially aligned price levels; and displaying at least one total bid indicator along at least one of the total bid locations, where the at least one total bid indicator is determined according to a total bid quantity available during the at least one of the plurality of prior time periods for the at least one of the total bid location for the at least one of the one of the plurality of axially aligned price levels with which the at least one of the total bid locations is aligned.

22. The non-transitory computer readable medium of claim 21 where a number of the prior time periods is variable.

23. The non-transitory computer readable medium of claim 15, where the acts further comprise:
for each of a plurality prior time periods, displaying a plurality of total ask locations, each of the plurality of total ask locations being aligned with the plurality of axially aligned price levels; and
displaying at least one total ask indicator along at least one of the total ask locations, where the at least one total ask indicator is determined according to a total ask quantity available during the at least one of the plurality of prior time periods for the at least one of the total ask location for the at least one of the one of the plurality of axially aligned price levels with which the at least one of the total ask locations is aligned.

24. The non-transitory computer readable medium of claim 23 where a number of the prior time periods is variable.

25. The non-transitory computer readable medium of claim 15 where an amount of time of the prior time period is variable.

26. The non-transitory computer readable medium of claim 15, where the acts further comprise:
receiving a user command via a user input device to select and place an icon in one of a plurality of order entry locations of an order entry region aligned with an associated one of the plurality of price levels of the price axis; and
in response to receiving the user command, submitting an order to the electronic exchange, the order having a price corresponding to the associated one of the plurality of price levels.

27. The non-transitory computer readable medium of claim 15, where the acts further comprise:
in response to receiving a user command to select and place an icon in one of a plurality of order entry locations aligned with an associated one of the plurality axially aligned price levels, submitting an order to the electronic exchange, the order having a price corresponding to the associated one of the plurality of axially aligned price levels.

28. The non-transitory computer readable medium of claim 27 where the user command establishes an order quantity for the order.

29. A method of displaying market depth information for a tradeable object using a graphical user interface, the method comprising:
displaying, via a display having an electronic processor, a plurality of order indicators in an order region aligned with a plurality of axially aligned price levels, each order indicator of the plurality of order indicators being associated with at least one order available for a tradeable object during a current time and being displayed along one of the plurality of axially aligned price levels corresponding to a price for the at least one order; and
displaying, via the display, a total quantity indicator along each price level of the plurality of axially aligned price levels at which an order indicator is displayed during a prior time period, the total quantity indicator being displayed for each time period of a plurality of prior time periods and representing a total order quantity available for the tradeable object during the prior time period.

30. The method of claim 29, further comprising:
in response to receiving a user command to select and place an icon in one of a plurality of order entry locations aligned with an associated one of the plurality axially aligned price levels, submitting an order to the electronic exchange, the order having a price corresponding to the associated one of the plurality of axially aligned price levels.

31. The method of claim 30 where the user command establishes an order quantity for the order.

* * * * *